US012525099B2

(12) United States Patent
Ito

(10) Patent No.: US 12,525,099 B2
(45) Date of Patent: Jan. 13, 2026

(54) CHECK-OUT APPARATUS

(71) Applicant: Toshiba Tec Kabushiki Kaisha, Tokyo (JP)

(72) Inventor: Masaki Ito, Numazu Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/741,016

(22) Filed: Jun. 12, 2024

(65) Prior Publication Data

US 2024/0331511 A1 Oct. 3, 2024

Related U.S. Application Data

(63) Continuation of application No. PCT/JP2022/044314, filed on Dec. 1, 2022.

(30) Foreign Application Priority Data

Feb. 3, 2022 (JP) ................................ 2022-015854

(51) Int. Cl.
*G07G 1/00* (2006.01)

(52) U.S. Cl.
CPC .................................. *G07G 1/0027* (2013.01)

(58) Field of Classification Search
CPC ........... G07F 9/00; G07F 9/06; G07G 1/0027; G07D 11/00; G07D 11/14; G07D 11/40; G07D 1/00; G07D 1/02; G07D 13/00
See application file for complete search history.

(56) References Cited

U.S. PATENT DOCUMENTS

| | | | | |
|---|---|---|---|---|
| 5,570,836 | A | 11/1996 | Tai | |
| 10,026,252 | B2 * | 7/2018 | Shimura ................ | G07G 3/003 |
| 2010/0189379 | A1 | 7/2010 | Razzaboni et al. | |

(Continued)

FOREIGN PATENT DOCUMENTS

| | | | |
|---|---|---|---|
| EP | 3203451 | A1 | 8/2017 |
| GB | 2218150 | A | 11/1989 |

(Continued)

OTHER PUBLICATIONS

International Search Report (ISR) and Written Opinion mailed Jan. 17, 2023 in International Application No. PCT/JP2022/044314, with Translation of the ISR, 9 pages.

(Continued)

*Primary Examiner* — Thien M Le
*Assistant Examiner* — April A Taylor
(74) *Attorney, Agent, or Firm* — Kim & Stewart LLP

(57) ABSTRACT

A check-out apparatus has a built-in coin receiving/dispensing device, and includes a drawer unit, a collection bag, a frame, and a support portion. The drawer unit is a container that is movably supported between an installation position provided on a lower side of a shelf board supporting the coin receiving/dispensing device and a pulled-out position pulled out from the installation position to a front side of the check-out apparatus, and has at least an upward opening. The collection bag is a bag-shaped container having an opening, and is used to collect coins. The frame keeps the opening in an open state. The support portion is provided on both side portions of the drawer unit, and supports the frame in a state in which the opening of the collection bag faces upward.

3 Claims, 9 Drawing Sheets

(56) References Cited

U.S. PATENT DOCUMENTS

| | | | | |
|---|---|---|---|---|
| 2013/0035024 | A1* | 2/2013 | Okawa | G07D 1/02 453/18 |
| 2017/0186261 | A1* | 6/2017 | Haraguchi | G07D 9/00 |
| 2017/0224134 | A1* | 8/2017 | Watanabe | G07D 11/60 |
| 2018/0232717 | A1 | 8/2018 | Haraguchi | |
| 2018/0305047 | A1 | 10/2018 | Takemura et al. | |
| 2021/0012604 | A1 | 1/2021 | Blake et al. | |
| 2021/0171309 | A1 | 6/2021 | Shimodaira et al. | |
| 2022/0186546 | A1 | 6/2022 | Razzaboni et al. | |

FOREIGN PATENT DOCUMENTS

| | | | |
|---|---|---|---|
| JP | 2018-132992 | A | 8/2018 |
| JP | 2021-092863 | A | 6/2021 |
| KR | 0159836 | B1 | 3/1999 |
| WO | 2021/044352 | A1 | 3/2021 |

OTHER PUBLICATIONS

Extended European Search Report mailed May 16, 2025 in European Patent Application No. 22924972.7, 8 pages.

Request for the Submission of an Opinion (Office Action) mailed Aug. 18, 2025 in corresponding Korean Patent Application No. 10-2024-7019872 with English machine translation, 10 pages.

* cited by examiner

CHECK-OUT APPARATUS

CROSS-REFERENCE TO RELATED APPLICATIONS

This application is a continuation application of International Application No. PCT/JP2022/044314, filed Dec. 1, 2022, which designates the United States, and which claims the benefit of priority from Japanese Patent Application No. 2022-015854, filed Feb. 3, 2022, the entire contents of which are incorporated herein by reference.

FIELD

Embodiments described herein relates generally to a check-out apparatus.

BACKGROUND

Conventionally, a check-out apparatus in which a coin receiving/dispensing device is built is used. As an example of such a check-out apparatus that handles cash, there is an accounting device (such as Patent Literature 1) for a customer to make a payment by himself/herself. Since such a check-out apparatus receives operation by a customer, a bill receiving/dispensing device and a coin receiving/dispensing device are stored in a housing in such a manner as not to be directly touched by the customer. In addition, the capacity of the coin receiving/dispensing device has been increased more and more in order to, for example, reduce the maintenance frequency of a storage amount.

Cash inside such a check-out apparatus is collected, for example, after a store is closed. Coins in the coin receiving/dispensing device are collected in a dedicated collection bag attached to a predetermined position in the device. Here, as the capacity of the coin receiving/dispensing device increases, the collection bag also increases in size and weight thereof in a state of being filled with coins increases as compared with that in a conventional case. Thus, it is necessary to further contrive a method of providing or attaching/detaching the collection bag.

Note that although an accounting device has been described above as an example, the same applies to, for example, a collection bag provided in a self-check-out apparatus. In addition, even in a money receiving/dispensing device operated by a store clerk, there is a similar problem with the collection bag as long as a similar structure is included.

It is thus preferable to provide a check-out apparatus capable of coping with an increase in capacity of a collection bag used for collection of coins stored in a coin receiving/dispensing device built in the check-out apparatus, and obtaining good operability.

BRIEF DESCRIPTION OF DRAWINGS

FIG. 3 is a perspective view illustrating a state in which the state of FIG. 2 is viewed obliquely from below.

DETAILED DESCRIPTION

A check-out apparatus of an embodiment has a built-in coin receiving/dispensing device, and includes a drawer unit, a collection bag, a frame, and a support portion. The drawer unit is a container that is movably supported between an installation position provided on a lower side of a shelf board supporting the coin receiving/dispensing device and a pulled-out position pulled out from the installation position to a front side of the check-out apparatus, and has at least an upward opening. The collection bag is a bag-shaped container having an opening, and is used to collect coins. The frame keeps the opening in an open state. The support portion is provided on both side portions of the drawer unit, and supports the frame in a state in which the opening of the collection bag faces upward.

Figure 1:
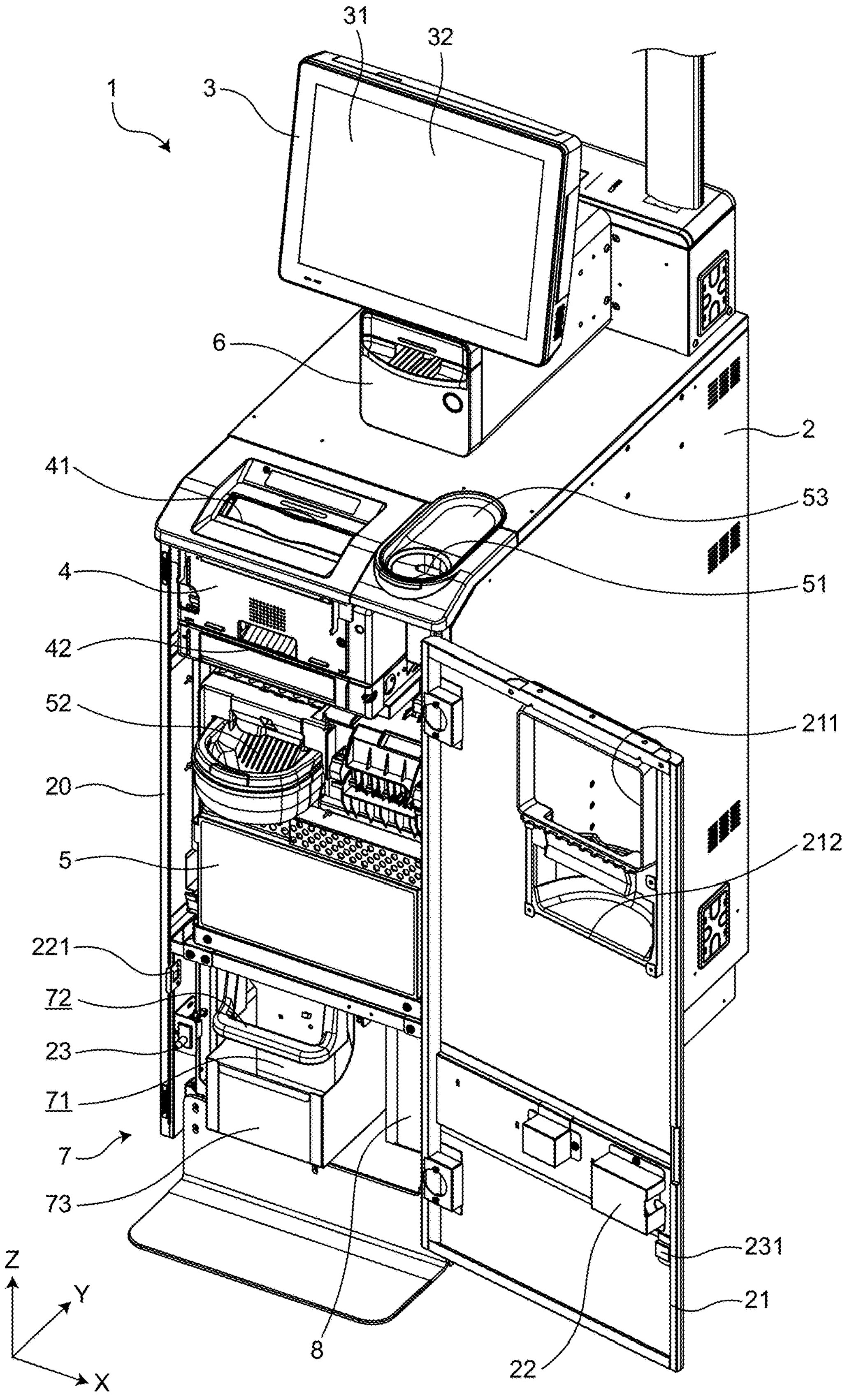
FIG. 1 is a perspective view illustrating an example of an appearance of a check-out apparatus in an embodiment.

FIG. 1 is a perspective view illustrating an example of an appearance of a check-out apparatus 1 in the present embodiment. For convenience of description, a three-dimensional coordinate system is also illustrated. A width direction (right-left direction) of the check-out apparatus 1 is an X-axis direction, a depth direction (front-back direction) is a Y-axis direction, and a height direction (up-down direction) is a Z-axis direction. Furthermore, a positive direction of a Y axis is a direction from a front side to a back side, and a state viewed in the positive direction of the Y axis is a front view. In addition, a positive direction of a Z axis is a direction from a bottom to a top, and a state viewed in a negative direction of the Z axis is a planar view. Note that a left side portion and a right side portion of when a device or a member is viewed from the front (positive direction of the Y axis) may be referred to as both side portions.

The check-out apparatus 1 includes a main body portion 2, a user interface (UI) terminal 3, a bill receiving/dispensing device 4, a coin receiving/dispensing device 5, a printer 6, a coin collection unit 7, an uninterruptible power supply (UPS) 8, and the like.

The main body portion 2 is a vertically long box-shaped housing, has an opening 20 on a front surface, and includes a door 21 that opens and closes the opening 20. The main body portion 2 further includes a lock 22, a strike 221, an opening/closing detection unit 23, a detection target unit 231, and a shelf board 25.

The lock 22 is attached to an inner side of the door 21 and creates a locked state, in which the door 21 is fixed in a state of closing the opening 20, by being caught by the strike 221 provided on an inner side of the opening 20.

In addition, the main body portion 2 supports the UI terminal 3 and the printer 6 on an upper surface, and stores the bill receiving/dispensing device 4, the coin receiving/dispensing device 5, the coin collection unit 7, and the UPS 8 therein. The coin receiving/dispensing device 5 is placed on the shelf board 25.

The UI terminal 3 is a device in charge of a user interface function, includes a display unit 31 and an operation unit 32 on a front surface of the housing, and includes a built-in control unit. Note that the UI terminal 3 may further include a communication interface or the like to communicate with an external device such as a speaker, a buzzer, or a store server.

The display unit 31 is a display device such as a liquid crystal monitor, and displays information for an operator (shopper or store clerk). In addition, the display unit 31 performs screen transition or the like by reflecting operation received by the operation unit 32. The operation unit 32 is an operation device such as a touch panel, is stacked and arranged on a surface of the display unit 31, and receives operation corresponding to the information displayed by the display unit 31.

The control unit includes a central processing unit (CPU), a read only memory (ROM), and a random access memory (RAM). The control unit integrally controls, in addition to the display unit 31 and the operation unit 32, an operation of each unit included in the check-out apparatus 1, such as the bill receiving/dispensing device 4, the coin receiving/dispensing device 5, and the printer 6 connected to the UI terminal 3.

The bill receiving/dispensing device 4 includes an insertion port 41 and a dispensing port 42, and includes a built-in bill storage portion. In accordance with the support by the control unit, the bill receiving/dispensing device 4 takes in a bill inserted into the insertion port 41, stores the bill in the storage portion, and carries a bill as change from the storage portion to the dispensing port 42.

The coin receiving/dispensing device 5 includes an insertion slot 51 and a dispensing port 52, and includes a built-in coin storage portion. According to the support of the control unit, the coin receiving/dispensing device 5 takes in a coin thrown into the insertion slot 51, stores the coin in the storage portion, and carries a coin as change from the storage portion to the dispensing port 52.

Note that the insertion slot 51 is provided in the upper surface of the main body portion 2 in the check-out apparatus 1 of the present embodiment. In addition, on a back side of the insertion slot 51, a tray 53 to check the inserted coin is continuously provided.

Furthermore, in the check-out apparatus 1 of the present embodiment, an opening 211 to expose the dispensing port 42 of the bill receiving/dispensing device 4, and an opening 212 to expose the dispensing port 52 of the coin receiving/dispensing device 5 are provided in the door 21.

In the check-out apparatus 1 of the present embodiment, the insertion port 41 of the bill and the insertion slot 51 of the coin are collectively arranged on a front side of the upper surface of the main body portion 2, and the dispensing port 42 of the bill and the dispensing port 52 of the coin are collectively arranged in a partial region of a front surface (door 21) of the main body portion 2, whereby usability is improved. More specifically, the arrangement is made specifically in consideration of prevention of the left bill and coin dispensed as the change.

The printer 6 issues a receipt or the like related to a payment made by the check-out apparatus 1 according to an instruction output by the control unit.

The UPS 8 is a device that supplies power stored in a built-in secondary battery to equipment (each unit included in the check-out apparatus 1 in the present embodiment) for a certain period of time in order to protect the equipment and data when a trouble such as a power failure, a momentary power interruption, or a voltage fluctuation is generated in a power supply.

Figure 2:
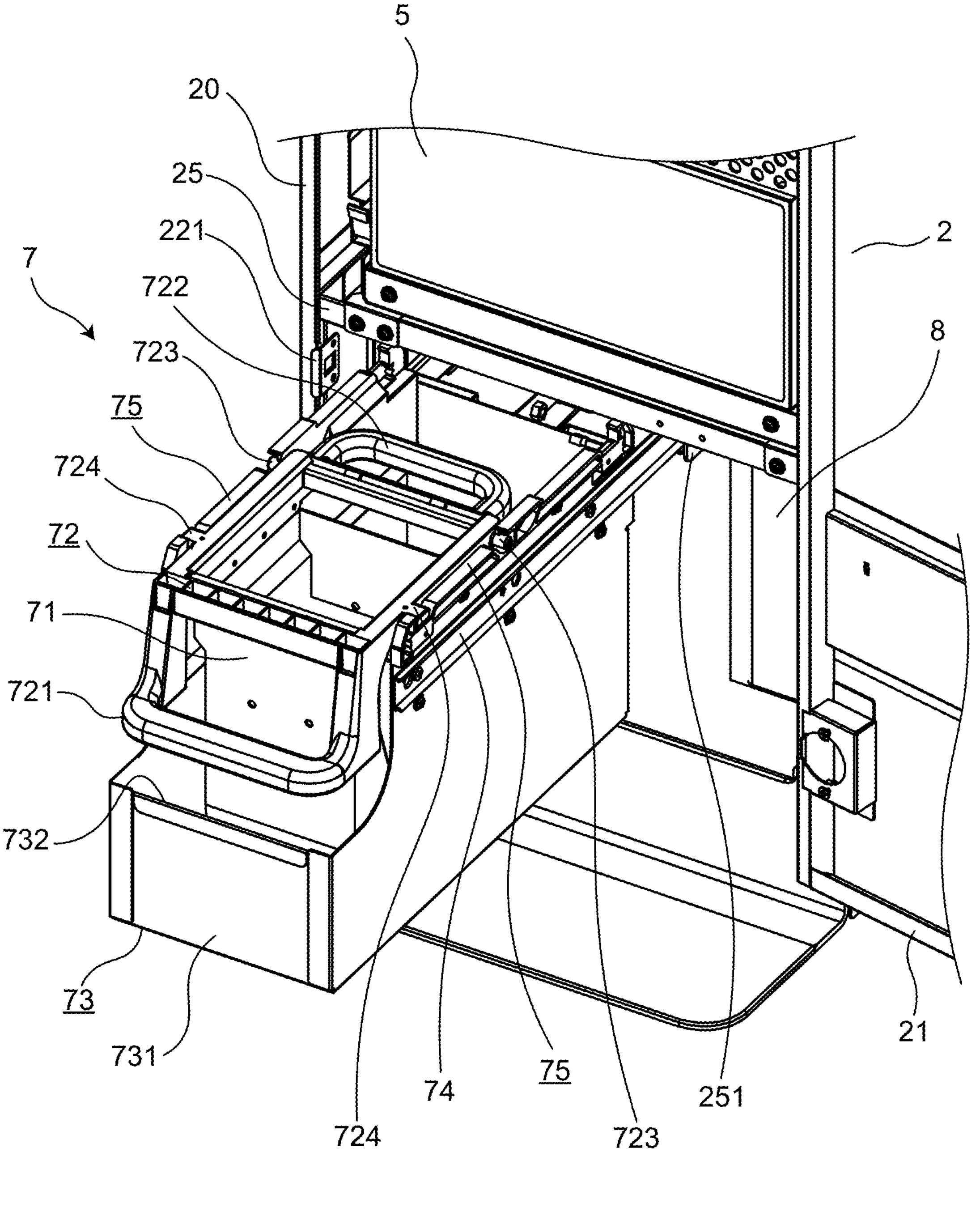
FIG. 2 is a view illustrating a state in which a coin collection unit is pulled out.
Figure 3:
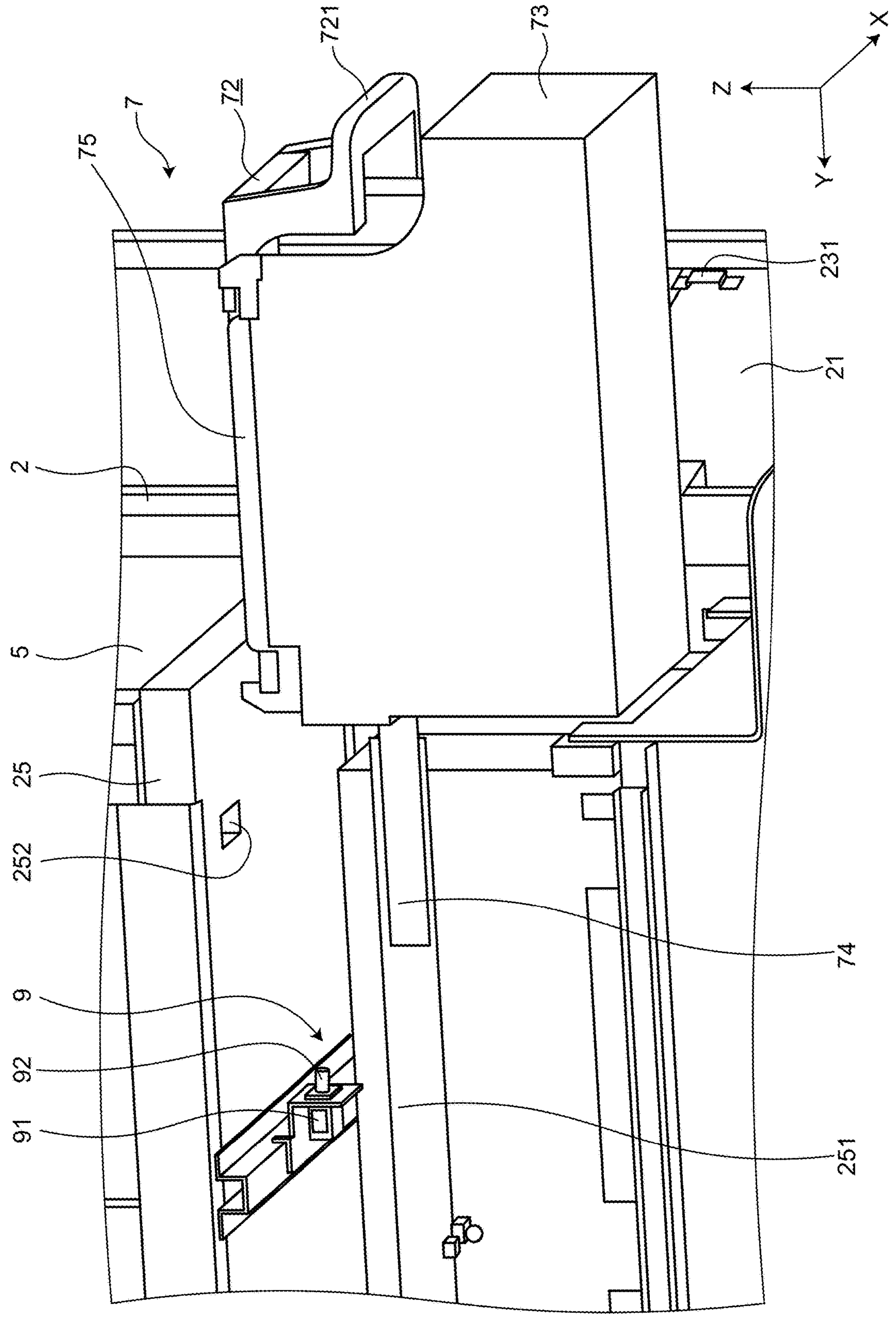
FIG. 3 is

FIG. 2 is a view illustrating a state in which the coin collection unit 7 is pulled out. In addition, FIG. 3 is a perspective view illustrating a state in which the state of FIG. 2 is viewed obliquely from below. The coin collection unit 7 is an example of a collection bag support structure. The coin collection unit 7 includes a collection bag 71, a frame 72, a drawer 73, a support portion 74, a rail 75, an attachment plate 76, and the like. In addition, the check-out apparatus 1 includes a detection unit 9 (see FIG. 3). Details of the detection unit 9 will be described later.

Figure 4:
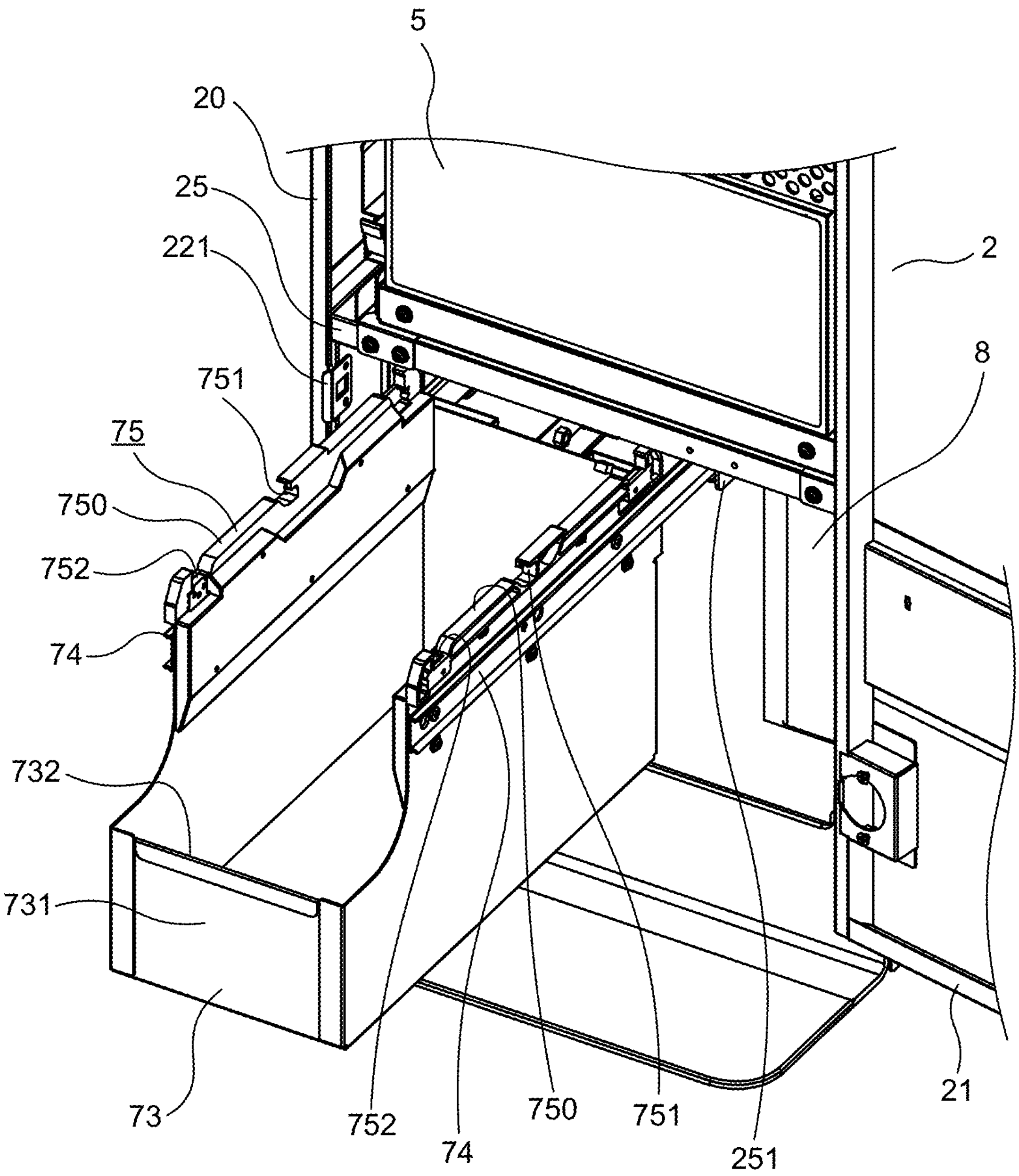
FIG. 4 is a perspective view of the coin collection unit after a frame and a collection bag are taken out.
Figure 5:
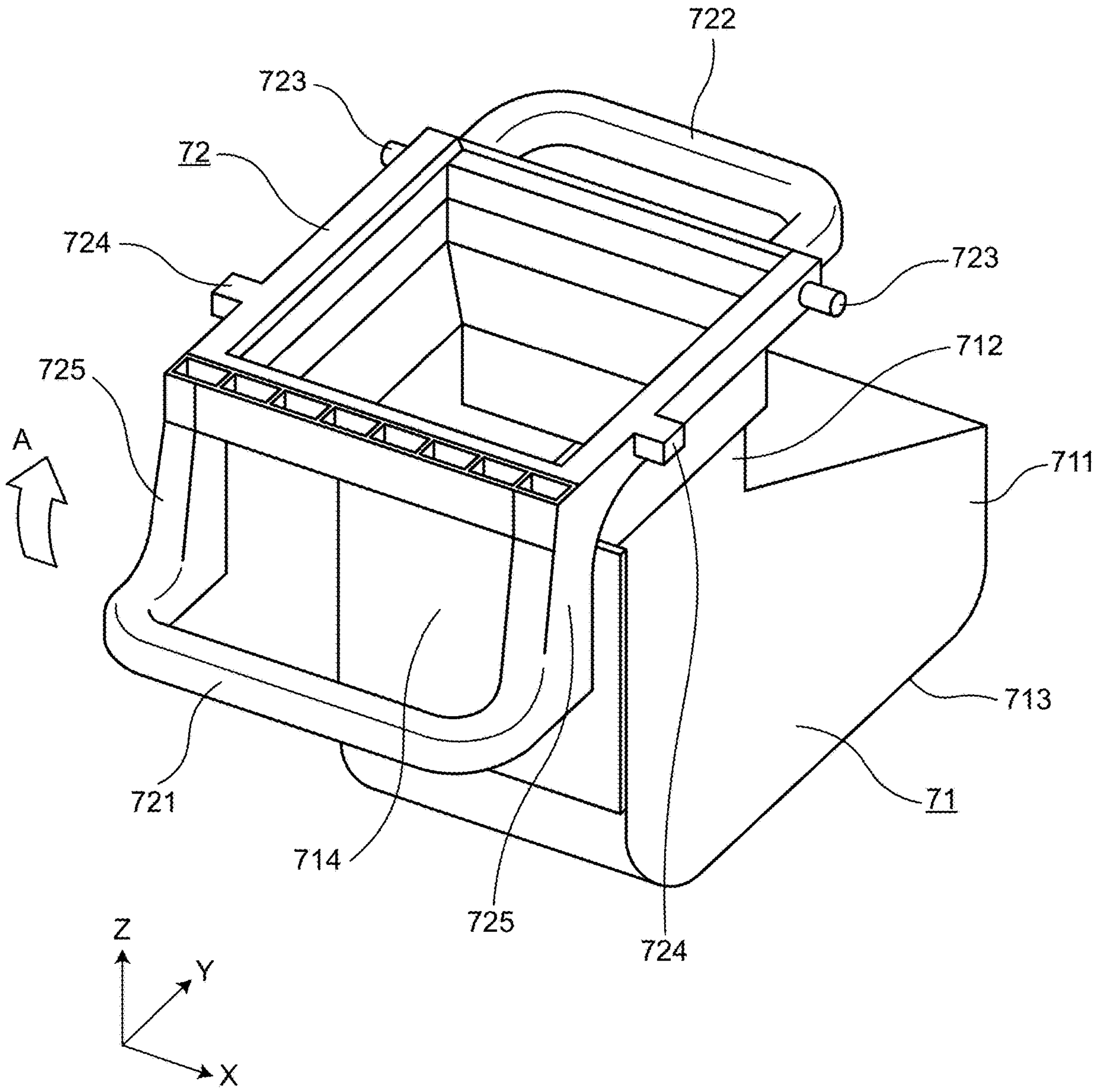
FIG. 5 is a perspective view illustrating an example of an appearance of the collection bag.

Furthermore, FIG. 4 is a perspective view of the coin collection unit 7 after the frame 72 and the collection bag 71 are taken out. FIG. 5 is a perspective view illustrating an example of an appearance of the collection bag 71.

The collection bag 71 is a bag-shaped container having an opening, and is used to collect coins stored in the coin receiving/dispensing device 5. In addition, the collection bag 71 includes a first portion 711 and a second portion 712.

Figure 6:
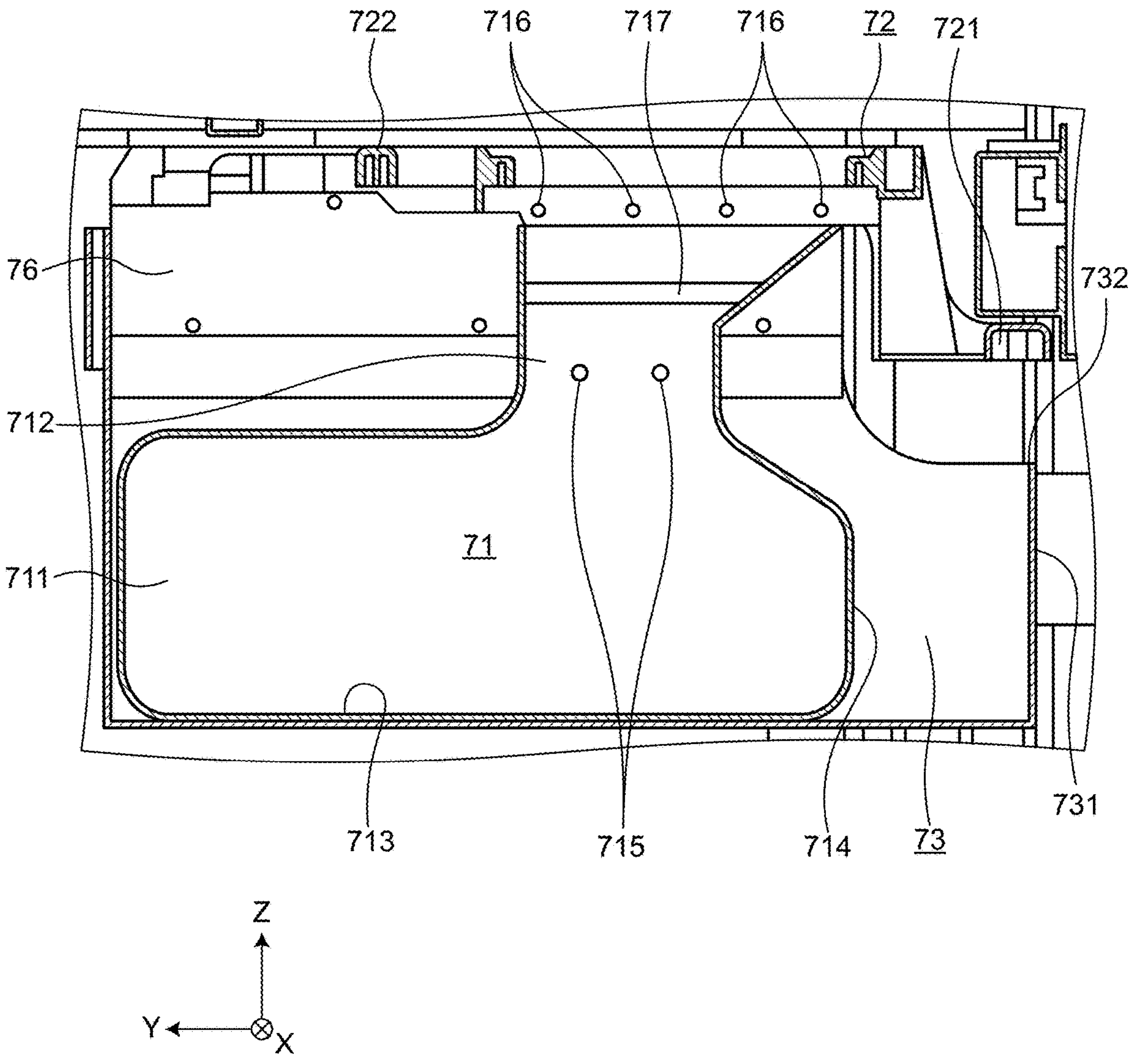
FIG. 6 is a longitudinal side view of the coin collection unit, the view illustrating an example of a structure of the collection bag.
Figure 7:
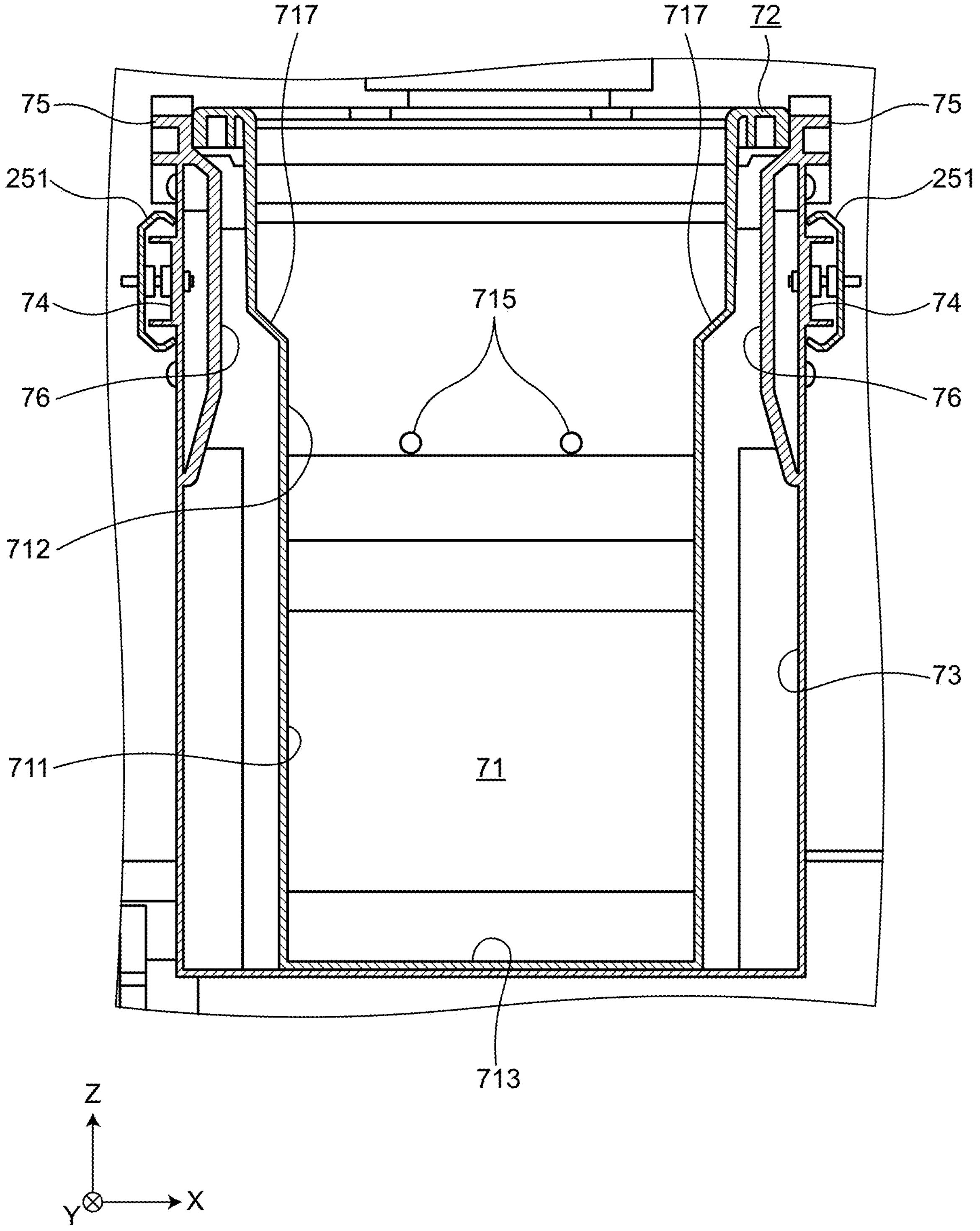
FIG. 7 is a longitudinal front view of the coin collection unit, the view illustrating the example of the structure of the collection bag.

Here, FIG. 6 is a longitudinal side view of the coin collection unit 7, the view illustrating an example of a structure of the collection bag 71. FIG. 7 is a longitudinal front view of the coin collection unit 7, the view illustrating the example of the structure of the collection bag 71.

The first portion 711 is a portion including a bottom 713. The bottom 713 is wider than the frame 72 at least in the depth direction in the planar view. As a result, the first portion 711 protrudes to a back side of the frame 72, and contributes to an increase in capacity of the collection bag 71.

The second portion 712 is a portion that connects the first portion 711 and the frame 72, and is located immediately below the frame 72. The second portion 712 has a tubular shape having a dimension equal to or smaller than the same degree as an inside dimension of the frame 72. In addition, the collection bag 71 further includes a string hole 715, through which a string is put, in the second portion 712. As a result, the opening of the collection bag 71 can be easily squeezed with a string or the like. By squeezing the opening with the string or the like, it is possible to prevent the stored coins from being dissipated at the time of transportation of the collection bag 71.

In addition, at least a dimension in the width direction orthogonal to the depth direction of the first portion 711 is set to be smaller than an inside dimension in the width direction of the drawer 73.

Furthermore, a front portion 714 of the collection bag 71 does not protrude to the front side and is formed flat. This is to prevent the front side of the collection bag 71 filled with the coins from being caught on an inner side of the drawer 73 when a movement indicated by an arrow A (see FIG. 5) (described later) is made by the collection bag 71.

The frame 72 is a member having a substantially square shape, and an edge of the opening of the collection bag 71 is fixed to an inner side surface thereof by a rivet 716. As a result, the frame 72 keeps the opening of the collection bag 71 in an open state.

The support portion 74 is a pair of arm-shaped members provided movably in a direction of moving in and out from the opening 20 of the main body portion 2 by a pair of slide rails 251 attached to a bottom surface of the shelf board 25. The support portion 74 supports the frame 72 from both side portions thereof. In addition, the support portion 74 supports the frame 72 with the opening of the collection bag 71 facing upward.

Hereinafter, a position of the support portion 74 inside the main body portion 2 is referred to as a storage position (see FIG. 1), and a position where the support portion 74 is completely pulled out of the main body portion 2 is referred to as a pulled-out position (See FIG. 2 and FIG. 3). In addition, the storage position is a position where the opening of the collection bag 71 is immediately below a coin collection hole 252 (see FIG. 3) formed in the shelf board 25. The coin collection hole 252 is provided at a position corresponding to a collection hole included in the bottom surface of the coin receiving/dispensing device 5.

The drawer 73 is, for example, a container made of sheet metal, has a box shape, and has an upward opening. Upper parts of both side walls of the drawer 73 (both side portions of an edge of the opening) are attached to the support portion 74. Thus, the drawer 73 is supported by the support portion 74. Thus, the drawer 73 moves along the slide rails 251 together with the support portion 74 between the storage position and the pulled-out position. Note that the drawer 73 is an example of a drawer unit.

A front wall (wall on the front side) 731 of the drawer 73 is formed lower than the others. That is, an edge 732 on the front side of the opening of the drawer 73 is lower than the others. This is to make it easy to take out the collection bag 71 from the drawer 73, and also to make it easy to grip the edge 732 and to make the edge 732 usable as a handle when the drawer 73 is moved back and forth when there is no frame 72 as illustrated in FIG. 4.

In addition, handles 721 and 722, and a pair of shafts 723 and protrusion portions 724 provided on the both side portions of the frame 72 are provided in the frame 72.

The handles 721 and 722 are to be gripped when the collection bag 71 is taken out from the drawer 73 and carried. The handle 721 is provided at a position on the front side of the frame 72 in a state of being supported by the support portion 74, and the handle 722 is provided at a position on the back side. In addition, the handle 721 is also a portion gripped by the operator at the time of operation of when the collection bag 71 and the frame 72 are supported by the support portion 74.

Figure 8:
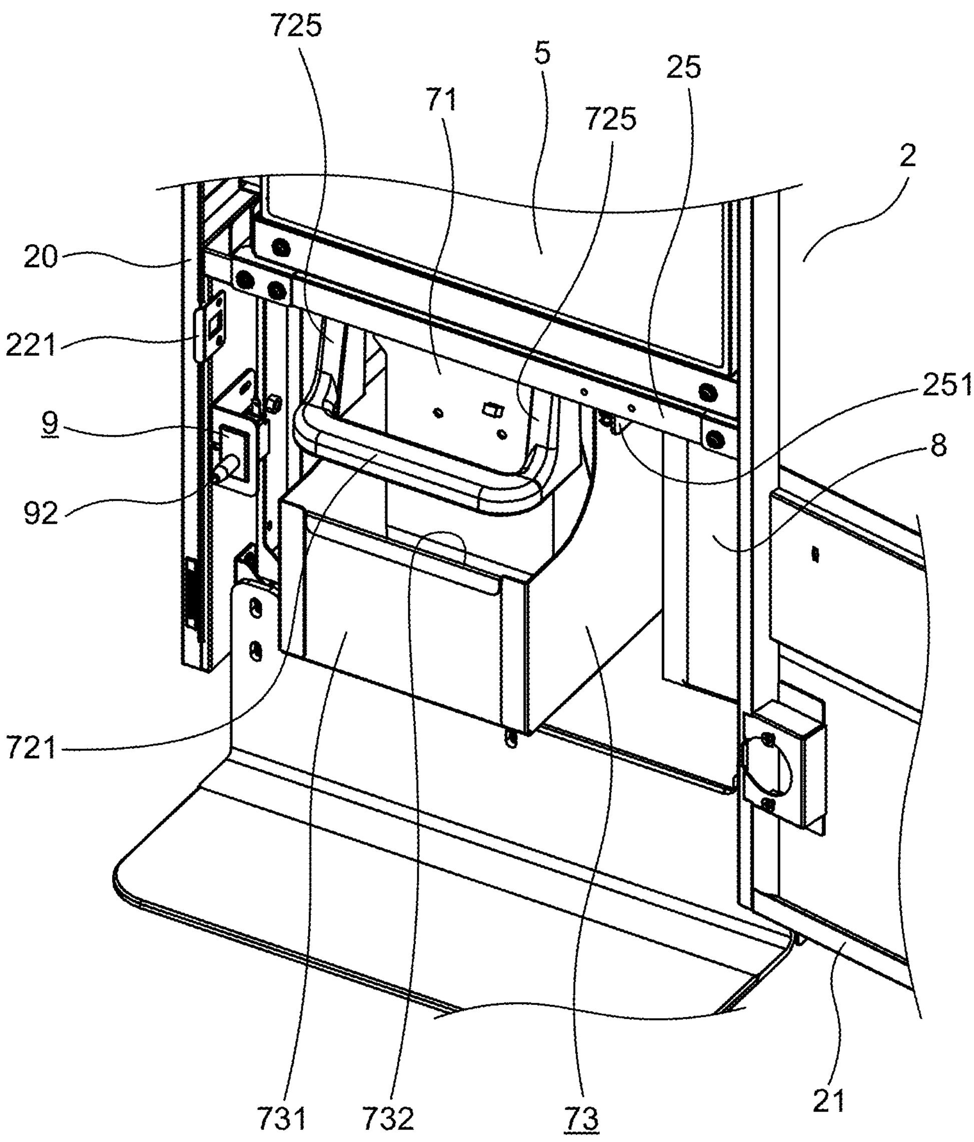
FIG. 8 is a view illustrating the coin collection unit located at a storage position.

Here, while the handle 722 on the back side is provided at the same height as an edge of the frame 72, the handle 721 on the front side is provided lower than the edge of the frame 72 by a coupling portion 725. As a result, as illustrated in FIG. 8, a gap is formed between the handle 721 and the shelf board 25 in a state of being stored in the main body portion 2, and the handle 721 is provided in a state of being easily gripped. FIG. 8 is a view illustrating the coin collection unit 7 located at the storage position.

Furthermore, since the handle 721 is not at the same height as the frame 72, a space between the handle 721 and the frame 72 is widened, and the handle 721 can be easily gripped. In addition, the back side of the handle 721 is the collection bag 71 and is made of a soft material such as cloth instead of a plate, and a hand is not blocked by a member on the back side and the handle 721 can be easily gripped when the handle 721 is gripped.

The pair of shafts 723 is provided in a manner of protruding from an outer peripheral surface at positions close to ends on the back side of the side portions of the frame 72, and serves as fulcrums of rotation of the frame 72. The frame 72 rotates with the shafts 723 as the fulcrums in such a manner that one end portion (end portion on the back side) of each of the side portions remains in the support portion 74 and the other end portion (end portion on the front side) moves away from and moves close to the support portion 74. The rotation in a direction in which the end portions on the front side of the frame 72 become away from the support portion 74 is indicated by an arrow A in FIG. 5.

Figure 9:
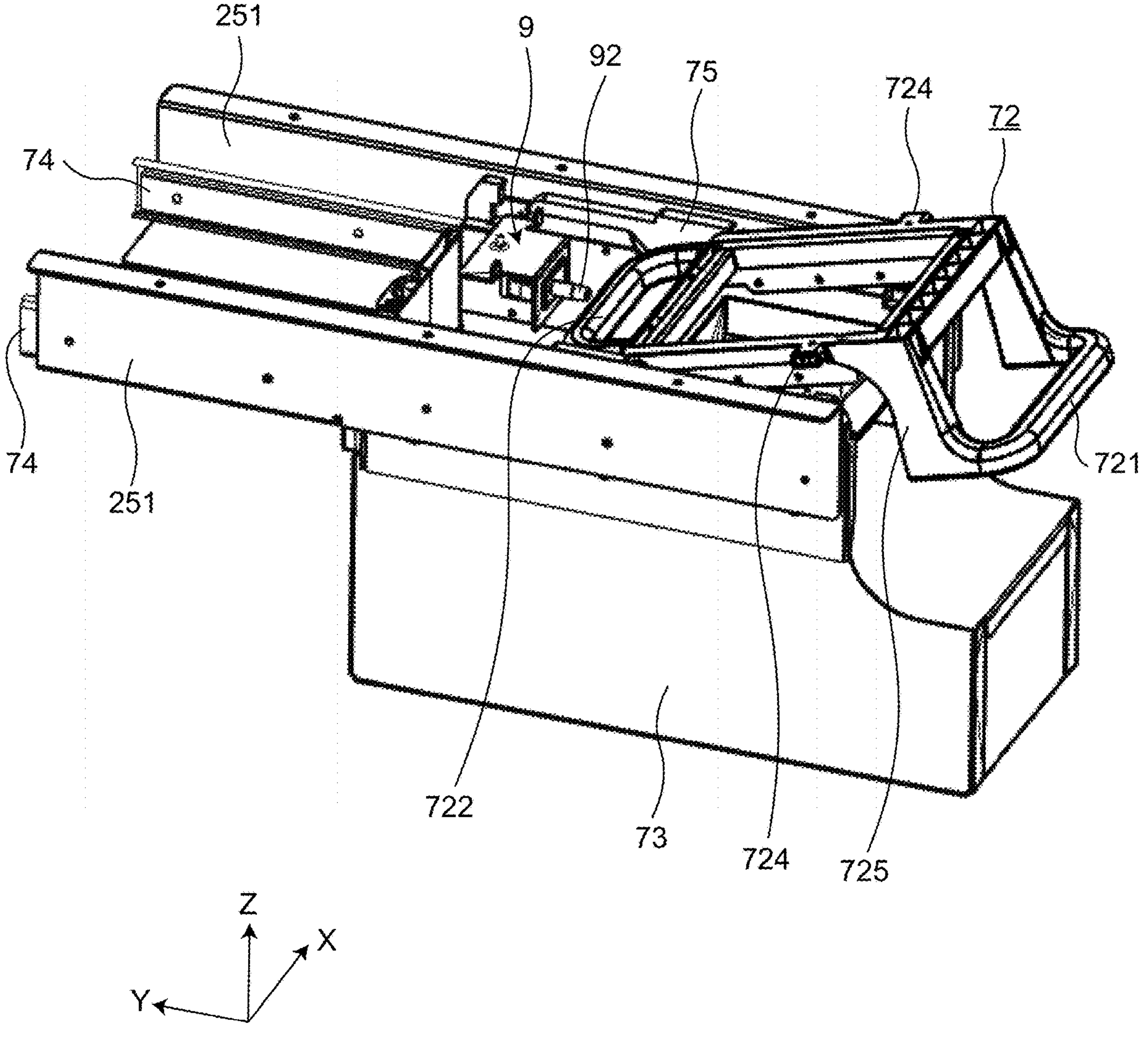
FIG. 9 is a view for describing a state in which the frame is rotated with respect to a support portion with a shaft as a fulcrum.

FIG. 9 is a view for describing a state in which the frame 72 is rotated with respect to the support portion 74 with the shafts 723 as the fulcrums. Note that in the actual check-out apparatus 1, when the support portion 74 is not located at the pulled-out position of being pulled out from the slide rails 251, the frame 72 collides with the shelf board 25 when being rotated. However, here, for convenience of illustration, a rotation state of the frame 72 with respect to the support portion 74 is illustrated in a state in which the shelf board 25 is not provided.

Next, prior to description of the protrusion portions 724, the detection unit 9 will be described. As illustrated in FIG. 3, the detection unit 9 includes a case 91, a protrusion 92, and a biasing member. The case 91 stores one end portion of the protrusion 92 and the biasing member, and is fixedly attached to the position of the frame 72 supported by the support portion 74 located at the storage position. The other end portion of the protrusion 92 protrudes from the case 91.

The protrusion 92 can freely move in and out between a non-detection position where a protrusion length with respect to the case 91 is long and a detection position where the protrusion length is short. The biasing member is built in the case 91, and biases the protrusion 92 toward the non-detection position. Such a detection unit 9 outputs information indicating that the frame 72 is detected to the control unit by emitting a predetermined signal when the protrusion 92 is at the detection position.

Note that a commercially available push sensor (switch) can be used as such a detection unit 9.

The detection unit 9 in the above-described manner is provided at a position where the protrusion 92 is pushed by the handle 722 on the back side of the frame 72 located at the storage position. As a result, the detection unit 9 detects presence or absence of the frame 72 at the storage position, and further detects that the collection bag 71 is set at a predetermined position.

In addition, the biasing member built in the detection unit 9 presses the handle 722 via the protrusion 92, and places the frame 72 at a predetermined position. A structure for this will be described next. First, the protrusion portions 724 are respectively provided at end portions on a side far from the shafts 723 (end portions on the front side) of the side portions of the frame 72, and are provided in a manner of protruding from the outer peripheral surface of the frame 72.

The rails 75 are respectively attached to the support portion 74, and respectively support the shafts 723 rotatably and guide the shafts 723 movably at least in the depth direction.

More specifically, each of the rails 75 is a member that is long in the depth direction and that is attached to an upper surface of the support portion 74, and includes a guide portion 750, and holding grooves 751 and 752 (see FIG. 4). The guide portion 750 is a flat surface provided on an upper surface of the rail 75, and leads (guides) the shaft 723 in a direction, in which the shaft 723 is to be moved, by slipping (sliding) the shaft 723.

The holding groove 751 is a groove that extends low and to the back compared to the guide portion 750, and holds the shaft 723 by preventing the shaft 723 from coming off upward and backward. The holding groove 752 is located on the opposite side of the holding groove 751 with the guide portion 750 interposed therebetween, and holds the protrusion portion 724.

The attachment plate 76 is located inside an upper portion of each of both side walls of the drawer 73. The attachment plate 76 is screwed together with the support portion 74 located outside the drawer 73 with the side wall of the drawer 73 interposed therebetween.

In the configuration in the above-described manner, when attaching the collection bag 71 and the frame 72 to the support portion 74, the operator places the frame 72 on the rails 75 from a side of the handle 722 in a state in which the support portion 74 is at the pulled-out position (see FIG. 4). The shafts 723 of the frame 72 slide on the guide portions 750 of the rails 75 at the pulled-out position toward the back side, and enters the holding grooves 751. In a state in which the operator grips the handle 721, the end portion on the front side of the frame 72 is floating from the rails 75. Thus, the protrusion portions 724 are not in contact with the rails 75.

Then, the operator rotates the frame 72 with the shafts 723 as the fulcrums, lowers the handle 721, and places the entire frame 72 on the rails 75. At this time, the protrusion portions 724 are held in the holding grooves 752 (see FIG. 2). Then, the operator pushes the drawer 73 into the storage position (see FIGS. 1 and 8).

Then, when detaching the collection bag 71 and the frame 72 from the support portion 74, the operator first pulls out the drawer 73 from the storage position to the pulled-out position. Then, the operator grips and lifts the handle 721 (direction indicated by the arrow A in FIG. 5), and pulls the handle 721 toward the front side. Then, the shafts 723 come out of the holding grooves 751, and slide and move on the upper surfaces of the guide portions 750 from the back side to the front side. With this movement, the frame 72 and the collection bag 71 move to the front side of the drawer 73. Then, the operator grasps the handle 721 and the handle 722, lifts the frame 72 and the collection bag 71, and takes out the frame 72 and the collection bag 71 from the drawer 73.

As described above, according to the check-out apparatus 1 of the present embodiment, it is possible to cope with an increase in capacity of the collection bag 71 used to collect the coins stored in the coin receiving/dispensing device 5 built in the check-out apparatus 1, and to obtain good operability.

That is, by two steps of setting the frame 72 and the collection bag 71 to the support portion 74 by moving the shafts 723 of the frame 72 along the upper surfaces of the rails 75, and then pushing the support portion 74 to the storage position, it is possible to correctly set the collection bag 71 at a predetermined position.

In addition, when the collection bag 71 is taken out, it is possible to detach the collection bag 71 by pulling out the support portion 74 to the pulled-out position and lifting and pulling the handle 721 in a manner opposite to the above steps.

Although some embodiments of the present invention have been described above, these embodiments are presented as examples, and are not intended to limit the scope of the invention. These novel embodiments can be implemented in various other forms, and various kinds of omission, substitution, modification, and combination can be made without departing from the gist of the invention. These embodiments and modifications thereof are included in the scope and gist of the invention, and are included in the invention described in claims and an equivalent scope thereof.

What is claimed is:

1. A check-out apparatus in which a coin receiving/dispensing device is built, the check-out apparatus comprising:

a drawer unit that is a container that is movably supported between an installation position provided on a lower side of a shelf board supporting the coin receiving/dispensing device and a pulled-out position pulled out from the installation position to a front side of the check-out apparatus and has at least an upward opening;

a collection bag that is a bag-shaped container having an opening and is used to collect coins;

a frame that keeps the opening in an open state; and a support portion that is provided on both side portions of the drawer unit and supports the frame in a state in which the opening of the collection bag faces upward, the frame including:

a handle that is a portion configured to be gripped by an operator who attaches and detaches the collection bag to and from the support portion, the handle being located to face the collection bag in a depth direction when the collection bag is supported by the support portion, hanging down from the frame; and a coupling portion that couples the handle and the frame with a vertical gap between the handle and the frame to allow a hand of the operator to put into the vertical gap.

2. The check-out apparatus according to claim 1, wherein the drawer unit has a box shape, and the support portion is provided above both side walls of the drawer unit.

3. The check-out apparatus according to claim 2, wherein the collection bag includes a first portion including a bottom, and a second portion that connects the first portion and the frame, the second portion is located immediately below the frame, the bottom is wider than the frame at least in the depth direction in a planar view, and at least a dimension of the first portion in a width direction orthogonal to the depth direction is set smaller than an inside dimension of the drawer unit in the width direction.

* * * * *